(12) United States Patent
Narkar et al.

(10) Patent No.: US 9,609,064 B2
(45) Date of Patent: Mar. 28, 2017

(54) PROPAGATING COMMUNICATION AWARENESS FOR COMMUNICATION SESSIONS

(71) Applicant: Microsoft Technology Licensing, LLC, Redmond, WA (US)

(72) Inventors: Vishal A. Narkar, Sammamish, WA (US); Pascal F. Menezes, Bellevue, WA (US); Gunter Leeb, Redmond, WA (US); William N. Hanlon, Bellevue, WA (US); Amer A. Hassan, Kirkland, WA (US); William George Verthein, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 45 days.

(21) Appl. No.: 14/449,002

(22) Filed: Jul. 31, 2014

(65) Prior Publication Data
US 2016/0036919 A1   Feb. 4, 2016

(51) Int. Cl.
*H04L 29/06*   (2006.01)
*H04L 29/08*   (2006.01)
*H04L 12/715*   (2013.01)

(52) U.S. Cl.
CPC ............ *H04L 67/141* (2013.01); *H04L 45/04* (2013.01)

(58) Field of Classification Search
CPC .................................................. H04L 65/1083
USPC ........ 709/226, 227, 228, 230, 238; 370/389, 370/401
See application file for complete search history.

(56) References Cited

U.S. PATENT DOCUMENTS

| 8,295,191 | B2* | 10/2012 | Leung | H04L 41/022 370/252 |
|---|---|---|---|---|
| 8,503,318 | B2 | 8/2013 | Leung et al. | |
| 2006/0251115 | A1* | 11/2006 | Haque | H04B 7/2606 370/466 |
| 2009/0049194 | A1* | 2/2009 | Csaszar | H04L 12/5695 709/242 |
| 2013/0254412 | A1 | 9/2013 | Menezes et al. | |
| 2014/0019626 | A1 | 1/2014 | Hubler et al. | |
| 2014/0136718 | A1 | 5/2014 | Menezes et al. | |

FOREIGN PATENT DOCUMENTS

| WO | WO-2009087671 | 7/2009 | |
|---|---|---|---|
| WO | WO 2009087671 A2 * | 7/2009 | ......... H04L 12/5695 |

OTHER PUBLICATIONS

"Analysis of the Autonomous System Network Topology"—Magoni et al, PSU, Sep. 2001 http://citeseerx.ist.psu.edu/viewdoc/download?doi=10.1.1.220.850&rep=rep1&type=pdf.*

(Continued)

*Primary Examiner* — Randy Scott

(57) ABSTRACT

Techniques for propagating communication awareness for communication sessions are described. In at least some embodiments, a communication session refers to an exchange of communication media between different communication endpoints. According to various embodiments, communication awareness of a communication session is propagated among various autonomous networks involved in routing the communication session. Communication awareness, for instance, is propagated out-of-band from a data stream that carries the communication session.

20 Claims, 8 Drawing Sheets

(56) References Cited

OTHER PUBLICATIONS

"Benefits of Deploying Unified Communications on a Cisco Integrated Network", retrieved from http://www.cisco.com/web/AP/partners/assets/docs/cisco_solution_brief_benefits_deploying_uc.pdf on Jul. 4, 2014, 15 pages.
"Cisco Collaboration System 9.x Solution Reference Network Designs (SRND)—Collaboration Deployment Models", Retrieved from http://www.cisco.com/c/en/us/td/docs/voice_ip_comm/cucm/srnd/collab09/clb09/models.html on Jul. 4, 2014, 20 pages.
Elnaka, et al., "Real-Time Traffic Classification for Unified Communication Networks", In Proceedings of International Conference on Selected Topics in Mobile and Wireless Networking, Aug. 19, 2013, 6 pages.
Wauters, et al., "Overlay Networks for Smart Grids", In Proceedings of IEEE Vision for Smart Grid Communications: 2030 and Beyond, May 31, 2013, 27 pages.
"International Search Report and Written Opinion", Application No. PCT/US2015/042348, Nov. 4, 2015, 13 pages.
Garcia,"COMET: Content Mediator Architecture for Content-Aware Networks", In IEEE Future Network & Mobile Summit, 2011, 8 pages.
Hancock,"Next Steps in Signaling (NSIS): Framework", Network Working Group Request for Comments: 4080, Jun. 2005, 49 pages.
"Second Written Opinion", Application No. PCT/US2015/042348, Jun. 23, 2016, 7 pages.
"International Preliminary Report on Patentability", Application No. PCT/US2015/042348, Nov. 3, 2016, 7 pages.

\* cited by examiner

PROPAGATING COMMUNICATION AWARENESS FOR COMMUNICATION SESSIONS

BACKGROUND

Modern communication systems have an array of capabilities, including integration of various communication modalities with different services. For example, instant messaging, voice/video communications, data/application sharing, white-boarding, and other forms of communication may be combined with presence and availability information for subscribers. Such systems may provide subscribers with the enhanced capabilities such as providing instructions to callers for various status categories, alternate contacts, calendar information, and comparable features. Furthermore, collaboration systems enabling users to share and collaborate in creating and modifying various types of documents and content may be integrated with multimodal communication systems providing different kinds of communication and collaboration capabilities. Such integrated systems are sometimes referred to as Unified Communication and Collaboration (UC&C) systems.

While UC&C systems provide for increased flexibility in communications, they also present a number of implementation challenges. For instance, a UC&C system typically utilizes multiple interconnected networks to route various communications. Since different networks may be managed by different entities, challenges thus arise in managing communications quality for communications that are routed among independently managed networks. Further, UC&C is typically implemented via software that can be loaded on mobile devices, e.g., tablets, smartphones, laptops, and so forth. Thus, techniques for managing UC&C communication traffic typically have to be fluid and dynamic to accommodate changing connection scenarios.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for propagating communication awareness for communication sessions are described. In at least some embodiments, a communication session refers to an exchange of communication media between different communication endpoints. According to various embodiments, communication awareness of a communication session is propagated among various autonomous networks involved in routing the communication session. Communication awareness, for instance, is propagated out-of-band from a data stream that carries the communication session.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
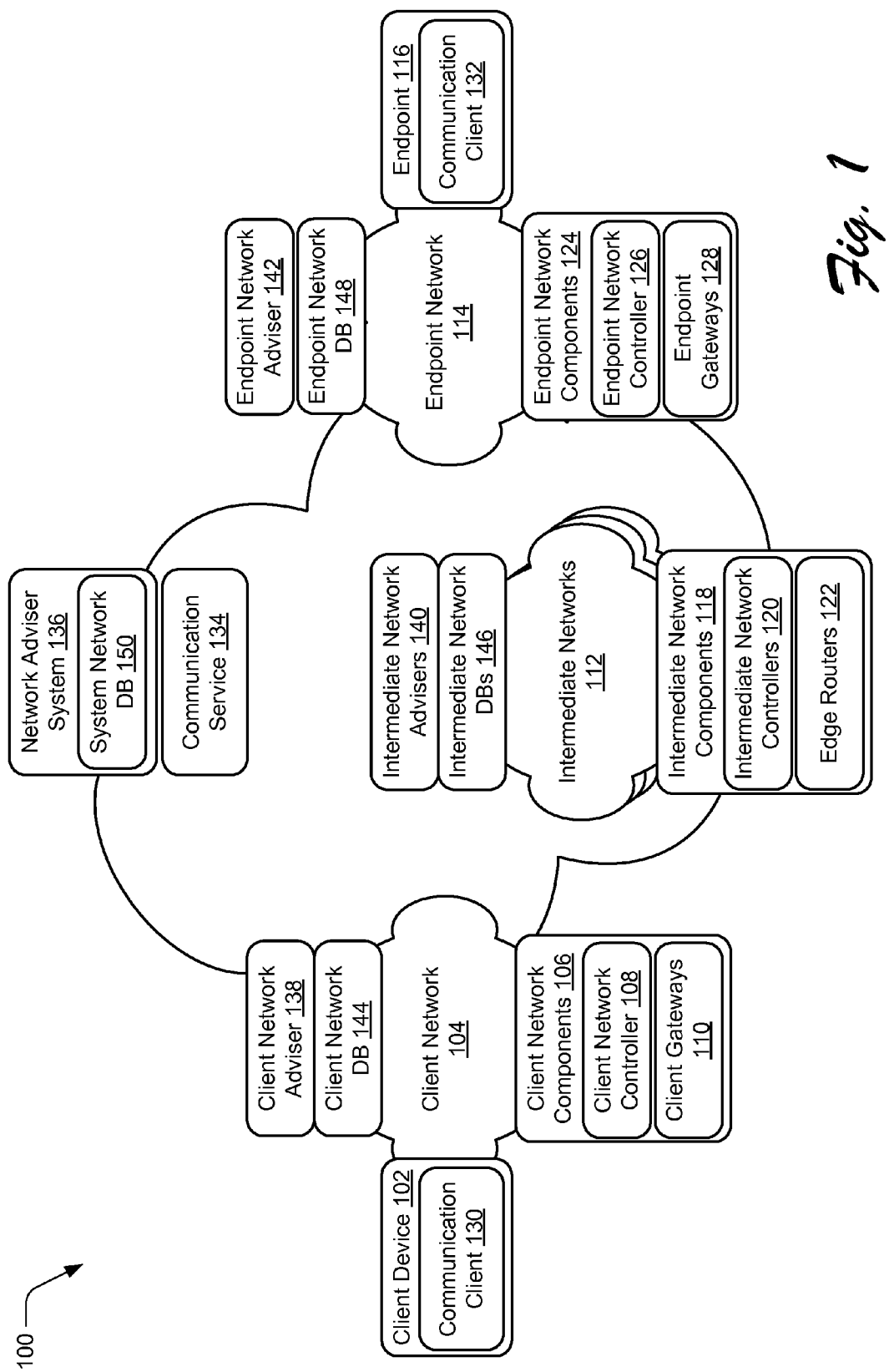
FIG. 1 is an illustration of an environment in an example implementation that is operable to employ techniques discussed herein.

Techniques for propagating communication awareness for communication sessions are described. In at least some embodiments, a communication session refers to a real-time exchange of communication media between different communication endpoints. Examples of a communication session include a Voice over Internet Protocol (VoIP) call, a video call, text messaging, a file transfer, content sharing, and/or combinations thereof. In at least some embodiments, a communication session represents a Unified Communication and Collaboration (UC&C) session.

According to various implementations, communication awareness of a communication session is propagated among various autonomous networks involved in routing the communication session. Generally, communication awareness includes attributes of the communication session, such as identifiers for endpoints involved in the communication session, identifiers for different autonomous networks involved in routing the communication session, performance attributes (e.g., session quality) across the different autonomous networks, and so forth. Communication awareness, for instance, is propagated out-of-band from a data stream that carries the communication session. Thus, propagation of communication awareness for a communication session is independent from the communication session itself.

According to various implementations, communication awareness for a communication session can be aggregated from different autonomous networks, and propagated among the autonomous networks. For instance, logic-based network advisers are deployed in individual autonomous networks. The network advisers can interface with one another across the different autonomous networks to share and accumulate communication awareness for a communication session. For instance, inter-network communication between different autonomous networks can be leveraged to aggregate and propagate communication awareness. Alternatively or additionally, a network adviser system can be employed that represents an integrated functionality with which different autonomous networks can interface to communicate and receive communication awareness.

Thus, techniques discussed herein provide diverse scenarios for enlightening different autonomous networks with communication awareness. Such communication awareness enables entities involved in routing communication sessions to make informed decisions regarding routing and handling of communication session data.

In the following discussion, an example environment is first described that is operable to employ techniques described herein. Next, a section entitled "Propagating Communication Awareness" discusses some example ways for propagating communication awareness in accordance with one or more embodiments. Following this, a section entitled "Example Implementation Scenarios" describes some example implementation scenarios in accordance with one or more embodiments. Next, a section entitled "Example Procedures" describes some example procedures in accordance with one or more embodiments. Finally, a section entitled "Example System and Device" describes an example system and device that are operable to employ techniques discussed herein in accordance with one or more embodiments.

Having presented an overview of example implementations in accordance with one or more embodiments, consider now an example environment in which example implementations may by employed.

Example Environment

FIG. 1 is an illustration of an environment 100 in an example implementation that is operable to employ techniques for propagating communication awareness for communication sessions described herein. Generally, the environment 100 includes various devices, services, and networks that enable communication via a variety of different modalities. For instance, the environment 100 includes a client device 102 connected to a client network 104. The client device 102 may be configured in a variety of ways, such as a traditional computer (e.g., a desktop personal computer, laptop computer, and so on), a mobile station, an entertainment appliance, a smartphone, a wearable device, a netbook, a game console, a handheld device (e.g., a tablet), and so forth.

The client network 104 is representative of a network that provides the client device 102 with connectivity to various networks and/or services, such as the Internet. The client network 104 may be provided and/or managed by a particular enterprise entity, such as an Internet Service Provider (ISP). For instance, the client network 104 represents a local access provider (LAP) network that provides the client device 102 with network connectivity. The client access network 104 may provide the client device 102 with connectivity via a variety of different connectivity technologies, such as broadband cable, digital subscriber line (DSL), wireless cellular, wireless data connectivity (e.g., WiFi™), T-carrier (e.g., T1), Ethernet, and so forth.

The client network 104 includes client network components 106, which are representative of different infrastructure components of the client network 104, such as hardware and logic for implementing and maintaining the client network 104. Examples of the client network components 106 include network switches, routers, gateways, and so forth. The client network components 106, for instance, include a client network controller 108 and client gateways 110. The client network controller 108 is representative of functionality to manage various aspects of the client network 104, such as connectivity and routing of the client network components 106. The client gateways 110 are representative of functionality for routing data from the client network 104 to other networks. Examples of the client gateways 110 include a border router, a customer-premises equipment (CPE) router, and/or other device that interfaces with other networks to exchange data.

According to various implementations, the client network controller 108 maintains state awareness of the various client network components 106. For example, the client network controller 108 maintains a mapping of the client network components 106 (e.g., in terms of location) and performance attributes of the client network controller 108, such as signal quality for the different client network controller 108, quality of service (QoS) attributes of the client network controller 108, and so forth.

The client network controller 108, for instance, includes connectivity and logic that accesses routing information for the client network components 106. For example, the client network controller 108 can access an Interior Gateway Protocol (IGP) and/or spanning tree switching topology for client the network components 106. This enables the client network controller 108 to identify different data routing paths within the client network 104, and to map and remap the different routing paths.

Connected to the client network 104 are intermediate networks 112, which in turn are connected to an endpoint network 114. The intermediate networks 112 and the endpoint network 114 are representative of different types and instances of wired and wireless networks that may be implemented and managed by different respective entities and according to a variety of different networking technologies, such as such as broadband cable, digital subscriber line (DSL), wireless cellular, wireless data connectivity (e.g., WiFi™), T-carrier (e.g., T1), Ethernet, and so forth.

According to various implementations, connectivity between the client network 104, the intermediate networks 112, and the endpoint network 114 provide different communication paths between the client device 102 and an endpoint 116. The endpoint 116 is representative of devices and/or functionalities with which the client device 102 may communicate.

The intermediate networks 112 include intermediate network components 118, which in turn include intermediate network controllers 120 and edge routers 122. Generally, the intermediate network components 118 are representative of different infrastructure components of the intermediate networks 112, such as hardware and logic for implementing and maintaining the intermediate networks 112. The intermediate network controllers 120 are representative of functionalities to manage various aspects of the intermediate networks 112, such as connectivity and routing of the intermediate network components 118. The edge routers 122 are representative of functionality for routing data from the intermediate networks 112 to other networks, such as the client network 104 and the endpoint network 114. According to various implementations, one or more of the edge routers 122 interface with one or more of the client gateways 110 to provide peering points between the client network 104 and the intermediate networks 112.

The endpoint network 114 includes endpoint network components 124, which in turn include an endpoint network controller 126 and endpoint gateways 128. Generally, the endpoint network controller 126 is representative of functionality to manage various aspects of the endpoint network 114, such as connectivity and routing for the endpoint network components 124. The endpoint gateways 128 are representative of functionality for routing data from the endpoint network 114 to other networks, such as the intermediate networks 112. For instance, one or more of the edge routers 122 interface with one or more of the endpoint gateways 128 to provide peering points between the endpoint network 114 and the intermediate networks 112. Example attributes and aspects of the endpoint network components 124 are discussed above with reference to the client network components 106.

According to various implementations, communication between the client device 102 and the endpoint 116 is facilitated via a communication client 130 of the client device 102, and a communication client 132 of the endpoint 116. Generally, the communication clients 130, 132 are representative of functionalities to enable different forms of communication via the client device 102 and the endpoint 116. Examples of the communication clients 130, 132 include a voice communication application (e.g., a VoIP client), a video communication application, a messaging application, a content sharing application, and combinations thereof. The communication clients 130, 132 for instance, enable different communication modalities to be combined to provide diverse communication scenarios.

In at least some implementations, the communication clients 130, 132 represent interfaces to a communication service 134. Generally, the communication service 134 is representative of a service to perform various tasks for management of communication between the client device 102 and the endpoint 116. The communication service 134, for instance, can manage initiation, moderation, and termination of communication sessions between the communication clients 130, 132.

The communication service 134 maintains a presence across many different networks and can be implemented according to a variety of different architectures, such as a cloud-based service, a distributed service, a web-based service, and so forth. Examples of the communication service 134 include a VoIP service, an online conferencing service, a UC&C service, and so forth. In at least some embodiments, the communication service 134 may be implemented as or be connected to a private branch exchange (PBX) in communication with a Public Switched Telephone Network ("PSTN") to enable voice communication between the client device 102 and other endpoints, such as the endpoint 116.

Further to techniques for propagating communication awareness for communication sessions discussed herein, the environment 100 includes a network adviser system 136. Generally, the network adviser system 136 is representative of functionality propagate communication awareness to different entities. "Communication awareness," for instance, refers to information pertaining to specific instances of communication sessions, networks involved in routing communication sessions, users that participate in communication sessions, and so forth.

According to various implementations, the network adviser system 136 interfaces with a client network adviser 138 of the client network 104, intermediate network advisers 140 of the intermediate networks 112, and an endpoint network adviser 142 of the endpoint network 114. The network adviser system 136 can receive communication awareness from the different network advisers, and can propagate communication awareness among the different network advisers to enable the individual networks to maintain state awareness of attributes of a communication session and thus make intelligent decisions to optimize communication session performance. In at least some implementations, the network advisers can be deployed in the different networks as agents of the network adviser system 136. Alternatively, the network advisers may be deployed and/or implemented independently of the network adviser system 136.

According to various implementations, the network advisers are representative of functionality to propagate communication awareness to network components of their respective networks, and to maintain state awareness of attributes of their respective networks. The client network adviser 138, for instance, is representative of functionality to interface with the client network controller 108 and/or other client network components 106 and serve as an information portal between the client network components 106 and other entities, such as the network adviser system 136 and/or other network advisers.

The intermediate network advisers 140 are representative of functionalities to interface with the intermediate network controllers 120 and/or other intermediate network components 118, and serve as information portals between the intermediate network components 118 and other entities, such as the network adviser system 136 and/or other network advisers. According to various implementations, individual of the intermediate networks 112 each include a different respective instance of the intermediate network advisers 140.

The endpoint network adviser 142 is representative of functionality to interface with the endpoint network controller 126 and/or other endpoint network components 124, and serve as an information portal between the endpoint network components 124 and other entities, such as the network adviser system 136 and/or other network advisers. Unless one of the client network adviser 138, the intermediate network advisers 140, or the endpoint network adviser 142 is specifically referenced, the term "network adviser" as used herein may refer to one or all of the client network adviser 138, the intermediate network advisers 140, or the endpoint network adviser 142.

According to one or more implementations, the network adviser system 136 may be implemented and/or maintained by the communication service 134, such as to propagate communication awareness for communication sessions managed by the communication service 134. Alternatively, the network adviser system 136 may be implemented separately and/or independently from the communication service 134. The network adviser system 136, for instance, may aggregate and propagate communication awareness for different entities and/or systems involved in communication sessions, such as different communication clients and communication services.

A client network database (DB) 144 is maintained for the client network 104, and is representative of functionality to track various types of information for the client network 104. For instance, the client network DB 144 may be employed to track state information for various client network components 106, such as performance attributes and statistics for the client network components 106. The client network controller 108, for example, can communicate state information for the client network components 106 to the client network adviser 138, which stores the state information as part of the client network DB 144. Alternatively or additionally, the client network controller 108 may interact with the client network DB 144 directly, such as to populate information to and retrieve information from the client network DB 144. According to various implementations, information from the client network DB 144 can be employed to make various decisions, such as for determining routing paths for communication sessions of the client device 102.

Intermediate network databases (DBs) 146 are maintained for the intermediate networks 112, and are representative of functionalities to track various types of information for the intermediate networks 112. According to various implementations, individual of the intermediate networks 112 each include different a respective instance of the intermediate network DBs 146. For instance, individual the intermediate network DBs 146 may be employed to track state information for respective intermediate network components 118, such as performance attributes and statistics for the intermediate network components 118 for a respective intermediate network 112. Further aspects and functionalities of the intermediate network DBs 146 are discussed above with reference to the client network DB 144.

An endpoint network database (DB) 148 is maintained for the endpoint network 114, and is representative of functionality to track various types of information for the endpoint network 114. For instance, the endpoint network DB 148 may be employed to track state information for various endpoint network components 124, such as performance attributes and statistics for the endpoint network components 124. Further aspects and functionalities of the endpoint network DB 148 are discussed above with reference to the client network DB 144.

According to one or more implementations, the network adviser system 136 maintains a system network database (DB) 150, which is representative of functionality to track various information pertaining to the different networks of the environment 100. For example, the system network DB 150 maintains active state awareness of network attributes of the client network 104, the intermediate networks 112, and the endpoint network 114. Examples of such network attributes include performance attributes, such as current and historical performance attributes of communication sessions across the different networks.

The system network DB 150 may also track communication awareness for various current and historical communication sessions, such as identifiers for individual communication sessions, endpoints involved in individual communication sessions, networks through which individual communication sessions are routed, and so forth. As further detailed herein, communication awareness pertaining to a communication session can be propagated out-of-band from data of the communication session itself. Thus, decisions concerning handling and routing of communication session data may be made without processing and/or handling the actual communication session data.

In at least some implementations, communication awareness pertaining to communication sessions and network conditions can be propagated among the different network advisers to provide end-to-end awareness of conditions affecting a communication session. For instance, the network advisers may communicate with one another to share information and independent of the network adviser system 136. Alternatively or additionally, communication awareness pertaining to communication sessions may be propagated from the individual network advisers to the network adviser system 136, which may aggregate the information as part of the system network DB 150. The network adviser system 136 may share communication awareness among the different networks to enable communication awareness to be propagated to entities involved in routing and handling communication sessions. As yet another implementation, the individual network controllers may communicate directly with the network adviser system 136 to send and receive communication awareness pertaining to communication sessions.

Generally, the client network 104, the individual intermediate networks 112, and the endpoint network 114 each represent individual autonomous networks that connect with each other via their respective peering points, e.g., gateways, edge routers, and so forth. The different networks, for instance, may be implemented and managed by different entities, such as different infrastructure and service providers. Thus, implementations discussed herein provide for a variety of different environments in which communication awareness may be propagated among different autonomous networks involved in routing and/or handling communication sessions.

Having described an example environment in which the techniques described herein may operate, consider now a discussion of example ways of propagating various attributes of communication sessions in communication systems in accordance with one or more embodiments.

Propagating Communication Awareness

According to various embodiments, techniques can be employed to dynamically enlighten various entities with communication awareness, such as information about communication sessions, information about network conditions, and so forth. For instance, notification events can be generated that include various attributes of communication sessions and network conditions. The notification events can be propagated to different entities further to techniques for propagating communication awareness for communication sessions discussed herein.

In at least some embodiments, notification events can be configured using a communication application programming interface (API) that can be leveraged to configure and communicate communication awareness to various entities involved in communication sessions. For example, the communication API can identify dialogue events and session events for which attributes of a communication session and/or network conditions can be identified. Consider, for instance, the following events and attributes that may be conveyed via a notification event generated using the communication API:

Dialogue Events—

These events apply to various portions of a communication session, such as the start, update, and end of a communication session. A dialogue event can include one or more of the following example attributes.

(1) Network Identifier: This attributes can be leveraged to identify a network, such as a network from which a dialogue event is received. In at least some implementations, the network identifier may include an autonomous system (AS) number that identifies a particular network. With reference to the environment 100, for instance, the network identifier may identify the client network 104, an intermediate network 112, and/or the endpoint network 114.

(2) Timestamp: This attribute can be leveraged to specify timestamps for a start of a communication session, updates that occur during a communication session, and an end (e.g., termination) of a communication session.

(3) Source IP Address: This attribute can be leveraged to specify an IP address for a device that is a source of media during a communication session, e.g., a device that initiates a communication session. With reference to the environment 100, for instance, the source IP address may be for the client device 102 or the endpoint 116.

(4) Destination IP Address: This attribute can be leveraged to specify an IP address for a device that is to receive media as part of a communication session. With reference to the environment 100, for instance, the destination IP address may be for the client device 102 or the endpoint 116.

(5) Transport Type: This attribute can be leveraged to specify a transport type or combination of transport types for a communication session. Examples of transport types include Transmission Control Protocol (TCP), User Datagram Protocol (UDP), and so forth.

(6) Source Port: this attribute can be leveraged to specify an identifier for a port at a source device, e.g., a source device identified by the Source IP Address referenced above.

(7) Destination Port: This attribute can be leveraged to specify an identifier for a port at a destination device, e.g., a destination device identified by the Destination IP Address referenced above.

(8) Media Type: This attribute can be leveraged to specify a media type and/or types that are to be transmitted and/or are being transmitted as part of a communication session. As discussed elsewhere herein, the communication session can involve multiple different types of media. Thus, the Media Type attribute can be employed to identify media types in a communication session, such as for applying the service policies discussed herein.

(9) Bandwidth Estimation: This attribute can be leveraged to specify an estimated bandwidth that is to be allocated for a communication session. The estimated bandwidth, for instance, can be based on various factors, such as a privilege level associated with a user, type and/or types of media included in a communication session, and so forth.

(10) To: This attribute can be leveraged to identify a user to which media in a communication session is to be transmitted.

(11) From: This attribute can be leveraged to identify a user from which media in a communication session is transmitted.

(12) Codec: This attribute can be leveraged to specify a codec or codecs utilized as part of a communication session.

(13) Error Code: This attribute can be leveraged to specify various error codes for errors that may occur as part of a communication session. For example, errors can include errors that occur during initiation the communication session, errors that occurred during a communication session, errors that occur when a communication session is terminated, and so forth.

Session Problem Events—

These events can be generated and applied when a communication session experiences errors, performance degradation, and so forth. A session problem event may include one or more of the attributes discussed above with reference to Dialogue Events, and may also include one or more of the following attributes.

(1) Mean Opinion Score (MOS) Degradation: This attribute can be leveraged to specify a MOS for a communication session. The attribute, for instance, can be used to indicate that an overall quality of a communication session has decreased.

(2) Jitter Inter-Arrival Time: This attribute can be leveraged to specify jitter values for a communication session. The attribute, for instance, can be used to indicate that a jitter value or values have increased, e.g., have exceeded a specified jitter value threshold.

(3) Packet Loss Rate: This attribute can be leveraged to specify a packet loss rate for a communication session. The attribute, for instance, can be used to indicate that a packet loss rate has increased, e.g., has exceeded a specified packet loss rate value threshold.

(4) Round Trip Delay (RTD): This attribute can be leveraged to specify RTD values for packets in communication sessions. The attribute, for instance, can be used to indicate that RTD values for packets have increased, e.g., have exceeded a specified RTD value threshold.

(5) Concealment Ratio: This attribute can be leveraged to specify a cumulative ratio of concealment time over speech time observed after starting a communication session. The attribute, for instance, can be used to specify that a concealment ratio has increased, e.g., has exceeded a specified concealment ratio value threshold.

Thus, various notifications discussed herein can include one or more of the attributes discussed above and can be used to propagate communication awareness to various entities. In at least some implementations, attributes can be linked to particular networks and/or network components to characterize performance attributes of the networks and/or network components.

Having described an example ways of propagating communication awareness, consider now some example implementation scenarios for propagating communication awareness for communication sessions in accordance with one or more embodiments.

Example Implementation Scenarios

The following section describes example implementation scenarios for propagating communication awareness for communication sessions in accordance with one or more implementations. The implementation scenarios may be implemented in the environment 100 discussed above, and/or any other suitable environment.

Figure 2:
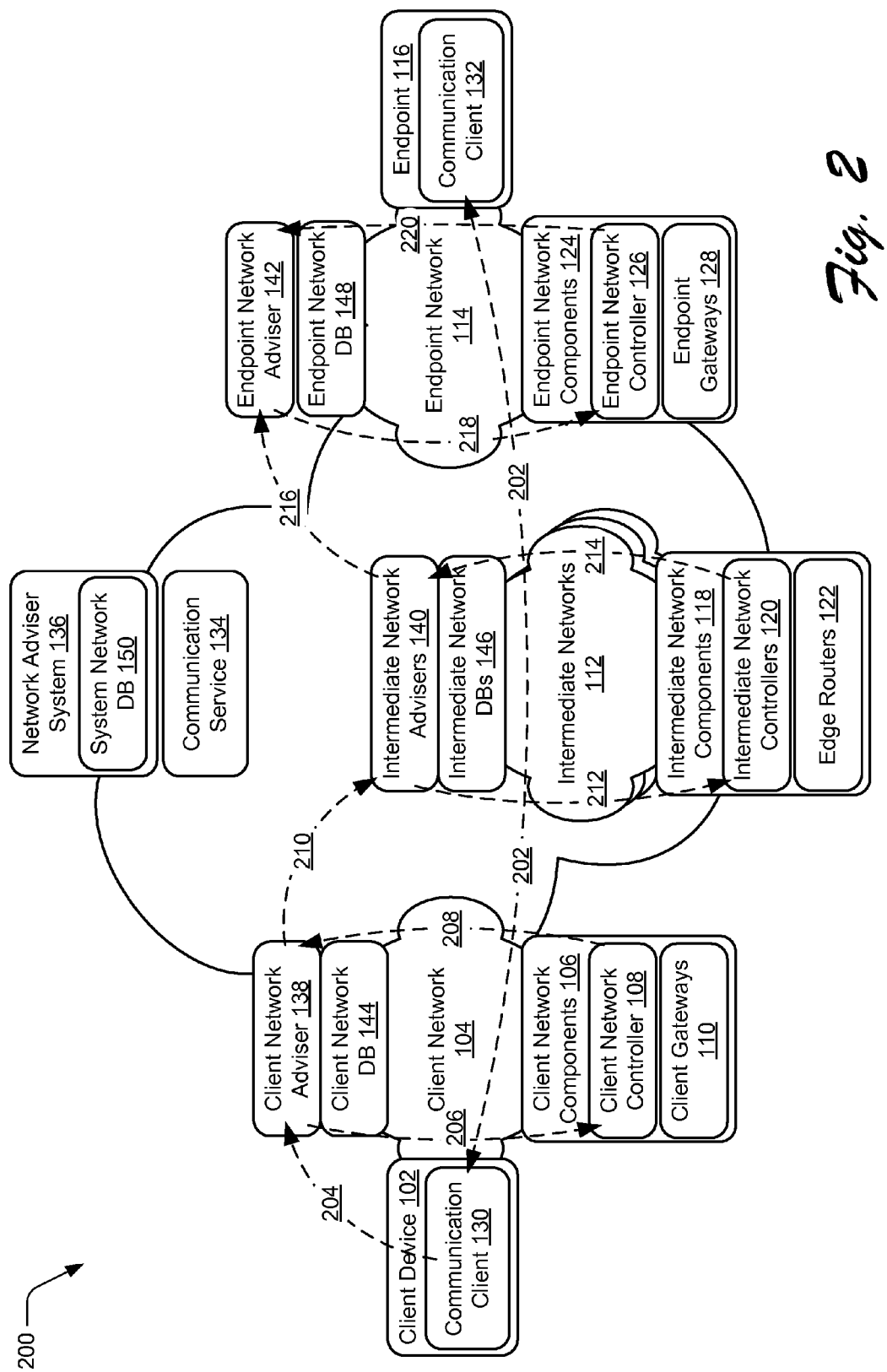
FIG. 2 illustrates an example implementation scenario for propagating communication awareness in accordance with one or more embodiments.

FIG. 2 illustrates an example implementation scenario 200 for propagating communication awareness in accordance with one or more implementations. The scenario 200 includes various entities and components introduced above with reference to the environment 100.

In the scenario 200, a user authenticates the client device 102 with the communication service 134 via the communication client 130. The user then enters a request to initiate a communication session with the endpoint 116. For instance, the user selects an indicia indicating a request to initiate a communication session, such as by entering a phone number for the endpoint 116, selecting a contact from a contact list, selecting a hyperlink, and so forth.

In response to the request to initiate the communication session, a communication session 202 is established between the communication client 130 of the client device 102, and the communication client 132 of the endpoint 116. According to various implementations, a routing path for routing the communication session is selected using any suitable algorithm, such as a shortest path algorithm applied by the client network controller 108, the intermediate network controllers 120, and/or the endpoint network controller 126. In at least some embodiments, the routing path is derived based on a particular routing protocol, such as Border Gateway Protocol (BGP).

Further in response to the request to initiate the communication session 202, the communication client 130 sends a start dialogue event 204 to the client network adviser 138. The start dialogue event 204 includes information to uniquely identify the communication session 202. For instance, the notification event referenced above can be used to communicate attributes of the communication session 202, such as Source and Destination identifiers, Port numbers, Session type, codec, and so forth.

Based on the start dialogue event 204, the client network adviser 138 communicates a session query 206 the client network controller 108 for information about the communication session 202. Generally, the session query 206 includes information from the start dialogue event 204, such as to identify the communication session 202. The session query 206 also requests routing information for the communication session 202.

In response to the session query 206, the client network controller 108 determines routing path information for the communication session 202 within the client network 104, such as an identifier for a particular client gateway 110 via which the communication session 202 is exiting the client network 104 to the intermediate networks 112. The client network controller 108 generates a session response 208 that includes the routing information. The session response 208 may also be populated with other information, such as performance attributes of the routing path in the client network 104. Examples of such performance attributes include available bandwidth, packet error rate, jitter, packet loss rate, and so forth, observed across the routing path. The client network controller then communicates the session response 208 to the client network adviser 138.

Further to the scenario 200, the client network adviser 138 generates a client session notification 210 that is populated with information from the start dialogue event 204 and the session response 208, such as identifiers for endpoints involved in the communication session 202, routing information (e.g., a client gateway 110 from which the communication session is exiting the client network 104), performance attributes of the routing path, and so forth. The client network adviser 138 communicates the client session notification 210 to an intermediate network adviser 140 for an intermediate network 112 that is the next network along the routing path of the communication session 202. For instance, the client network adviser 138 communicates the client session notification 210 through the client gateway 110 that is identified by the client network controller 108 as being the exit gateway for the communication session 202.

Accordingly, the intermediate network adviser 140 receives the client session notification 210 and parses the notification to determine the various information included therein. The intermediate network adviser 140, for instance, identifies the client device 102 and the endpoint 116 from the client session notification 210. According to various implementations, the intermediate network adviser 140 stores information from the client session notification 210 in the intermediate network DB 146. For instance, a session record for the communication session 202 is created in the intermediate network DB 146, and the information from the client session notification 210 is stored as part of the session record.

Continuing with the scenario 200, the intermediate network adviser 140 generates a session query 212 that includes information from the client session notification 210, such as identifiers for the client device 102 and the endpoint 116, performance attributes of the client network 104, and so forth. The intermediate network adviser 140 communicates the session query 212 the intermediate network controller 120 for the respective intermediate network 112. Generally, the session query 212 requests routing information for the communication session 202 within the intermediate network 112.

The intermediate network controller 120 receives the session query 212 and determines a routing path for the communication session 202 within the intermediate network 112, such as based on the identification of the endpoint 116 (e.g., the IP address and/or other identifier) and utilizing any suitable routing path algorithm and/or protocol. The intermediate network controller 120 returns a session response 214 to the intermediate network adviser 140 that identifies a routing path of the communication session 202 within the intermediate network 112.

The session response 214, for instance, identifies intermediate network components 118 through which the communication session is routed, and an edge router 122 via which the communication session 202 exits the intermediate network 112 on its way to the endpoint 116. The session response 214 further includes performance attributes of the routing path.

Further to the scenario 200, the intermediate network adviser 140 generates an intermediate session notification 216 which includes routing information for the communication session 202 from the session response 214. The intermediate network adviser 140 also populates the intermediate session notification 216 with routing information from the client session notification 210. Thus, according to various implementations, the intermediate session notification 216 includes cumulative path routing information for the communication session 202 that starts at the client device 102 up to the edge router 122 via which the communication session 202 exits the intermediate network 112 and enters the endpoint network 114.

In addition to being used to generate the intermediate session notification 216, such cumulative path routing information may be stored in the intermediate network DB 146. For instance, the cumulative path routing information may be stored as part of a session record for the communication session 202, as part of a network record for the client network 104 and the intermediate network 112, and so forth.

While the scenario 200 is discussed with reference to the communication session 202 being communicated through a single intermediate network 112, it is to be appreciated that in at least some implementations, the communication session 202 may travel through multiple intermediate networks 112 between the client network 104 and the endpoint network 114. Thus, the process described above for ascertaining and communication routing path information may be performed multiple times (e.g., iteratively) across multiple different intermediate networks 112 to cumulatively aggregate routing path information for the communication session 202 across multiple different intermediate networks 112. According, in one or more implementations, the intermediate session notification 216 includes path routing information for the client network 104 and multiple intermediate networks 112.

Continuing with the scenario 200, the intermediate network adviser 140 communicates the intermediate session notification 216 to the endpoint network adviser 142. For instance, the intermediate network adviser 140 transmits the intermediate session notification 216 through an edge router 122 that is identified by the intermediate network controller 120 as being the exit router for the communication session 202.

The endpoint network adviser 142 receives the intermediate session notification 216 and parses the notification to determine the various information included therein. The endpoint network adviser 142, for instance, identifies the client device 102 and the endpoint 116 from the intermediate session notification 216. The endpoint network adviser 142 generates a session query 218 that includes information from the intermediate session notification 216, such as identifiers for the client device 102 and the endpoint 116, performance attributes of the client network 104 and/or the intermediate network 112, and so forth. The endpoint network adviser 142 communicates the session query 218 the endpoint network controller 126. Generally, the session query 218 requests routing information for the communication session 202 within the endpoint network 114.

According to various implementations, the endpoint network adviser 142 stores information from the intermediate session notification 216 in the endpoint network DB 148, such as part of a session record for the communication session 202.

Further to the scenario 200, the endpoint network controller 126 receives the session query 218 and determines a routing path for the communication session 202 within the endpoint network 114, such as based on the identification of the endpoint 116 (e.g., the IP address and/or other identifier) and utilizing any suitable routing path algorithm and/or protocol. The endpoint network controller 126 returns a session response 220 to the endpoint network adviser 142 that identifies a routing path of the communication session 202 within the endpoint network 114.

The session response 220, for instance, identifies endpoint network components 124 through which the communication session 202 is routed to from the endpoint gateway 128 to the endpoint 116. The session response 220 further includes performance attributes of the routing path.

The endpoint network adviser 142 stores information from the session response 220 in the endpoint network DB 148. For instance, the information is stored in a session record for the communication session 202, a network record, and so forth.

Accordingly, the endpoint network adviser 142 aggregates cumulative path route information for the communication session 202, starting with the client network 104, through intermediate network(s) 112, and within the endpoint network 114 up to the endpoint 116. The endpoint network adviser 142 may store this information in the endpoint network DB 148, such as part of a session record for the communication session 202, network records for different networks involved in communicating the communication session 202, and so forth.

According to various implementations, the endpoint network adviser 142 may communicate the cumulative path route information to other entities, such as back to the intermediate network adviser 140 and/or the client network adviser 138. Thus, communication awareness of conditions pertaining to the communication session 202 can be shared among autonomous networks involved in routing and/or handling the communication session.

Figure 3:
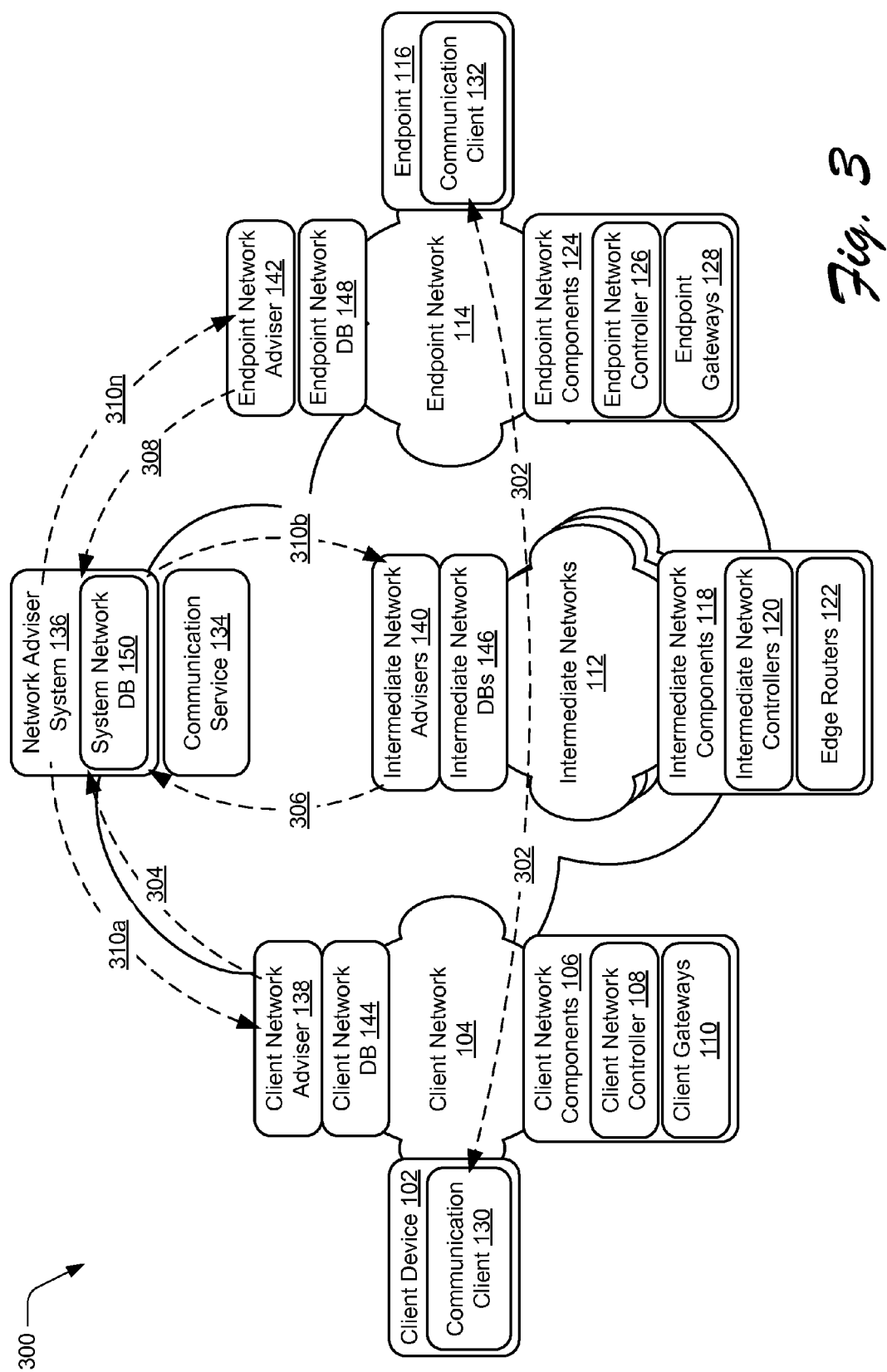
FIG. 3 illustrates an example implementation scenario for aggregating and propagating communication awareness in accordance with one or more embodiments.

FIG. 3 illustrates an example implementation scenario 300 for aggregating and propagating communication awareness in accordance with one or more implementations. The scenario 300 includes various entities and components introduced above with reference to the environment 100. In at least some implementations, the scenario 300 represents an alternative or additional scenario to the scenario 200.

In the scenario 300, a communication session 302 is initiated or scheduled to be initiated between the client device 102 and the endpoint 116. Accordingly, the client network adviser 138 ascertains path routing information for the communication session 302 across the client network 104. Example ways of ascertaining path routing information are discussed above, and may include querying the client network controller 108 for the path routing information.

The client network adviser 138 generates a client session notification 304 that includes the path routing information, and communicates the client session notification 304 to the network adviser system 136. The network adviser system 136 ascertains path routing information from the client session notification 304, such as identifiers for the client device 102 and the endpoint 116, client network components 106 through which the communication session 302 is routed, performance attributes of the communication session 302 across the client network 104, and so forth. The network adviser system 136 stores the path routing information in the system network DB 150, such as part of a session record for the communication session 302, a network record for the client network 104, and so forth.

Continuing with the scenario 300, the intermediate network adviser 140 ascertains path routing information for the communication session 302 across the intermediate network 112. Example ways of ascertaining path routing information are discussed above, and may include querying the intermediate network controller 120 for the path routing information.

The intermediate network adviser 140 generates an intermediate session notification 306 that includes the path routing information, and communicates the intermediate session notification 306 to the network adviser system 136. The network adviser system 136 ascertains path routing information from the intermediate session notification 306, such as identifiers for the client device 102 and the endpoint 116, intermediate network components 118 through which the communication session is routed, performance attributes of the communication session 302 across the intermediate network 112, and so forth. The network adviser system 136 stores the path routing information in the system network DB 150, such as part of a session record for the communication session 302, a network record for the intermediate network 112, and so forth.

Further to the scenario 300, the endpoint network adviser 142 ascertains path routing information for the communication session 302 across the endpoint network 114. Example ways of ascertaining path routing information are discussed above, and may include querying the endpoint network controller 126 for the path routing information.

The endpoint network adviser 142 generates an endpoint session notification 308 that includes the path routing information, and communicates the endpoint session notification 308 to the network adviser system 136. The network adviser system 136 ascertains path routing information from the endpoint session notification 308, such as identifiers for the client device 102 and the endpoint 116, endpoint network components 124 through which the communication session is routed, performance attributes of the communication session 302 across the endpoint network 114, and so forth. The network adviser system 136 stores the path routing information in the system network DB 150, such as part of a session record for the communication session 302, a network record for the endpoint network 114, and so forth.

Continuing with the scenario 300, the network adviser system 136 communicates communication awareness 310a to the client network adviser 138, communication awareness 310b to the intermediate network adviser 140, and communication awareness 310n to the endpoint network adviser 142. According to various implementations the communication awareness 310a, 310b, 310n represent aggregations of path routing and other information received from the different network advisers. The communication awareness 310a, 310b, 310n, for instance, may be duplicates of one another and may identify end-to-end path routing information for the communication session 302. Alternatively, the communication awareness 310a, 310b, 310n may each include different sets of information that are individually tailored to the specific network and/or network adviser to which they are communicated.

Thus, the scenario 300 illustrates that in at least some implementations, the network adviser system 136 can serve to aggregate communication awareness from different networks. The network adviser system 136, for instance, serves as a centralized service that can receive, aggregate, and propagate communication awareness.

As referenced above, the scenario 300 may represent an alternative or addition to the scenario 200. For instance, in an alternative scenario, communication awareness may be aggregated and propagated by the network adviser system 136, but not via inter-network communication between the different network advisers. In an additional scenario, communication awareness can be aggregated and propagated between the different network advisors, as well as being aggregated and propagated by the network adviser system 136. Thus, techniques discussed herein provide for diverse scenarios for propagating communication awareness among entities involved in communication sessions.

In at least some implementations, the various notifications, queries, and responses discussed in the scenarios above may be configured using the example notification events discussed above, such as via the communication API detailed above. For instance, values for the various attributes discussed with reference to the communication API can be used to propagate the various information discussed with reference to the scenarios 200, 300. Thus, the communication API may be leveraged to propagate communication awareness among different entities involved in communication sessions.

As illustrated in the scenarios, communication awareness of the communication sessions 202, 302 is propagated out-of-band from the communication sessions, e.g., using data streams that are independent of the communication session 202 and the communication session 302. For instance, the various notifications and responses represent instances of communication awareness that may be propagated among entities involved in communication sessions.

While the scenarios are discussed with reference to a communication session between the client device 102 and the endpoint 116, it is to be appreciated that the techniques discussed herein may be employed to propagate communication awareness for multiple communication sessions, e.g., multiple concurrent communication sessions. For instance, the various queries, responses, and notifications may be employed to determine and propagate communication awareness for multiple concurrent communication sessions that include the communication session 202 and/or the communication session 302, such as part of a conference call that involves the client device 102, the endpoint 116, and other endpoints not expressly illustrated. As another example, the communication session 202 and/or the communication session 302 may be part of a multicast communication event from the client device 102 to multiple other endpoints including the endpoint 116. Thus, communication awareness may be propagated along multiple different routing paths and for individual communication sessions that are concurrently occurring or scheduled to be implemented concurrently.

While the scenarios are discussed with reference to communication awareness being propagated in conjunction with and/or after the communication sessions 202, 302 are initiated, this is not intended to be limiting. For instance, the various queries, responses, and notifications may be generated and communicated prior to initiating the communication sessions 202, 302. In at least some implementations, for instance, the scenarios 200, 300 may be performed in response to detecting that the communication session 202 and/or the communication session 302 are scheduled to be initiated. A calendar event, for instance, may indicate that the communication session 202 and/or the communication session 302 is scheduled to be initiated at a scheduled future date and time.

Thus, the scenarios may be performed to propagate communication awareness of the communication session 202 and/or the communication session 302 prior to the schedule date and time. Such proactive communication awareness may be employed for various purposes, such as enable individual networks to set aside resources to handle the scheduled communication sessions 202, 302.

In at least some implementations, the scenarios may be performed while a communication session is in progress, such as multiple times during a communication session. For instance, the scenarios may be performed periodically during a communication session to maintain active state awareness of communication session conditions. Alternatively or additionally, the scenarios may be performed in response to a trigger event, such as an indication of session problems and/or of network problems within a particular network. Thus, communication awareness propagated according to the scenarios 200, 300 may be leveraged for various purposes, such as for session initiation, session diagnostics and repair, session termination, post-session analytics, and so forth.

Accordingly, communication awareness of conditions pertaining to communication sessions can be shared among entities involved in routing and/or handling the communication sessions. Such communication awareness can be leveraged in various ways, such as for optimizing performance of the communication sessions, mitigating errors that occur and/or may occur in the communication sessions, and so forth.

Having discussed some example implementation scenarios, consider now a discussion of some example procedures in accordance with one or more embodiments.

Example Procedures

The following discussion describes some example procedures for propagating communication awareness for communication sessions in accordance with one or more embodiments. The example procedures may be employed in the environment 100 of FIG. 1, the system 800 of FIG. 8, and/or any other suitable environment. The procedures, for instance, represent example procedures for implementing the implementation scenarios described above. In at least some embodiments, the steps described for the various procedures can be implemented automatically and independent of user interaction.

Figure 4:
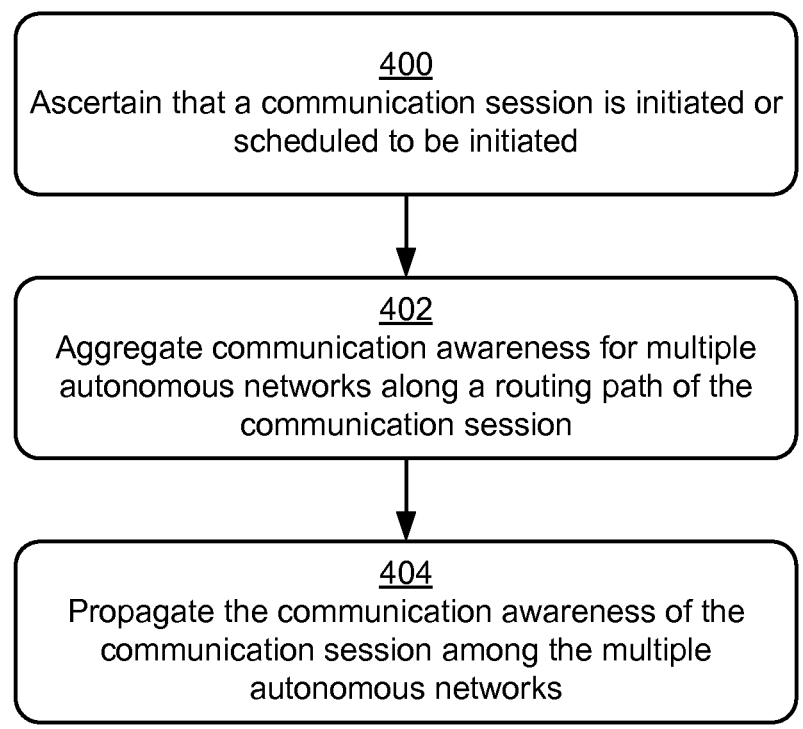
FIG. 4 is a flow diagram that describes steps in a method for propagating communication awareness in accordance with one or more embodiments.

FIG. 4 is a flow diagram that describes steps in a method in accordance with one or more implementations. The method describes an example procedure for propagating communication awareness in accordance with one or more implementations.

Step 400 ascertains that a communication session is initiated or scheduled to be initiated. Generally, a communication session refers to an exchange of communication media between different communication endpoints. With reference to the environment 100, for example, one or more of the network advisers receives an indication of a communication session that involves one or more of the networks. The indication can be received in various ways, such as via a notification from a communication client (e.g., the communication client 130), from a network controller, from the network adviser system 136, and so forth.

In at least some implementations, a scheduled communication session can be detected, such as based on a calendar event that includes a scheduled communication session. For instance, a user can leverage a calendar application to schedule a calendar event for a future date and time, such as a web meeting, a conference call, a multicast session, and so forth. The user can specify parameters for the calendar event, such as a date and time, users to be invited, types of communication media involved, and so forth. Thus, ascertaining that a communication session is scheduled to be initiated can be based on detecting a calendar event that includes the communication session.

Step 402 aggregates communication awareness for multiple autonomous networks along a routing path of the communication session. Example ways of aggregating communication awareness are discussed above, such as with reference to the scenarios 200, 300. For instance, communication awareness can be aggregated based on communication of routing path attributes between different networks, e.g., between different network advisers.

Alternatively or additionally, communication awareness can be received and aggregated by a system that is implemented separately from the autonomous networks, such as the network adviser system 136. For example, the network adviser system 136 can receive routing path attributes from the individual autonomous networks, and can aggregate the routing path attributes to generate communication awareness.

Generally, communication awareness includes various types of information that pertains to a communication session, as well as networks and entities involved in the communication session. Example attributes that may be included in communication awareness are detailed above with reference to the notification events and/or the communication API. Communication awareness, for instance, identifies endpoints involved in a communication session, media type(s) for a communication session, attributes (e.g., performance attributes) of autonomous networks through which the communication session is routed or will be routed, and so forth.

Step 404 propagates the communication awareness of the communication session among the multiple autonomous networks. The communication awareness, for instance, is communicated out-of-band from a data stream of the communication session.

In at least some implementations, the communication awareness is communicated between the autonomous networks themselves, such as via network-to-network communications. For instance, network advisers for the different autonomous networks can engage in direct communication with one another to exchange communication awareness.

Alternatively or additionally, communication awareness can be propagated by a service and/or system that is implemented separately from the autonomous networks, such as the network adviser system 136.

Figure 5:
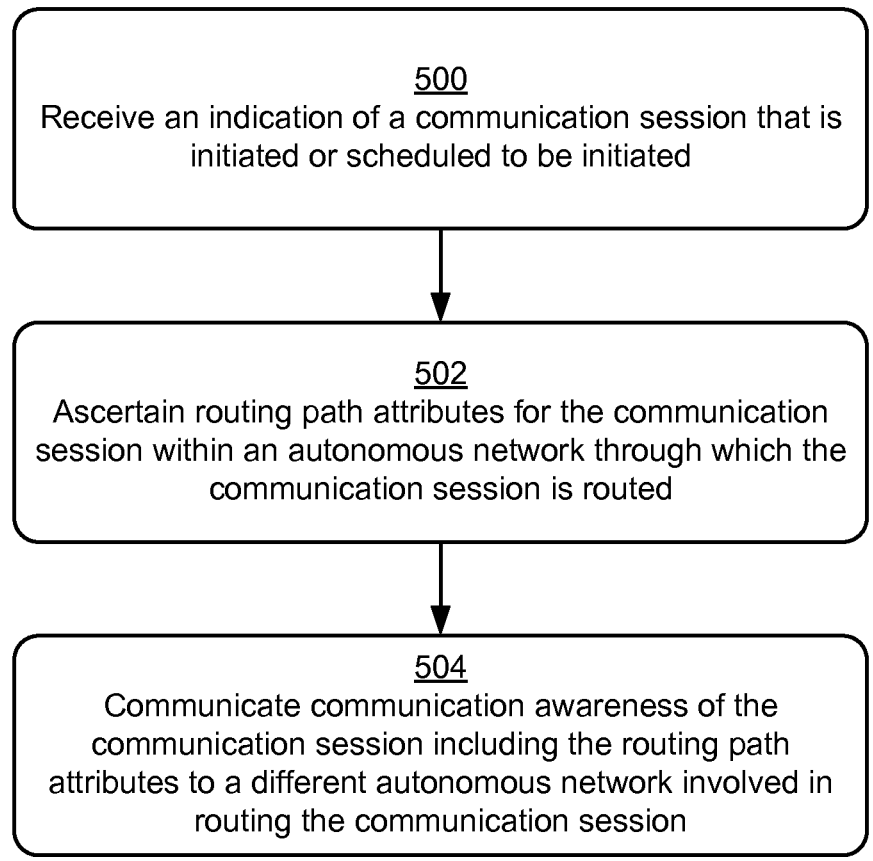
FIG. 5 is a flow diagram that describes steps in a method for communicating communication awareness in accordance with one or more embodiments.

FIG. 5 is a flow diagram that describes steps in a method in accordance with one or more embodiments. The method describes an example procedure for communicating communication awareness in accordance with one or more embodiments.

Step 500 receives an indication of a communication session that is initiated or scheduled to be initiated. A network adviser for a particular autonomous network, for instance, receives a notification that a communication session is initiated, such as from a communication client. Alternatively or additionally, a separate system or service (e.g., the network adviser system 136) receives an indication that a communication session is initiated. The network adviser system 136, for instance, may be notified of the communication session, such as by a network adviser, the communication service 134, and so forth.

Step 502 ascertains routing path attributes for the communication session within an autonomous network through which the communication session is routed. With reference to the environment 100, for instance, a network adviser can ascertain routing path attributes via a query to a respective network controller. Alternatively or additionally, the network adviser system 136 can ascertain the routing path attributes, such as via a notification from a respective network adviser and/or network controller. Examples of various routing path attributes are detailed above.

Step 504 communicates communication awareness of the communication session including the routing path attributes to a different autonomous network involved in routing the communication session. The communication awareness, for instance, is communicated out-of-band from a data stream of the communication session. For example, a network adviser for the autonomous network can communicate the communication awareness to a network adviser for the different autonomous network. Alternatively or additionally, the network adviser system 136 can communicate the communication awareness to a network adviser for the different autonomous network.

In at least some implementations, the communication awareness may represent cumulative routing path attributes for multiple different autonomous networks. As discussed above with reference to the example implementation scenarios, communication awareness may be cumulatively aggregated via communication of routing path attributes between different autonomous networks. Alternatively or additionally, portions of communication awareness may be communicated from different autonomous networks to the network adviser system 136, which may aggregate and propagate the communication awareness.

Figure 6:
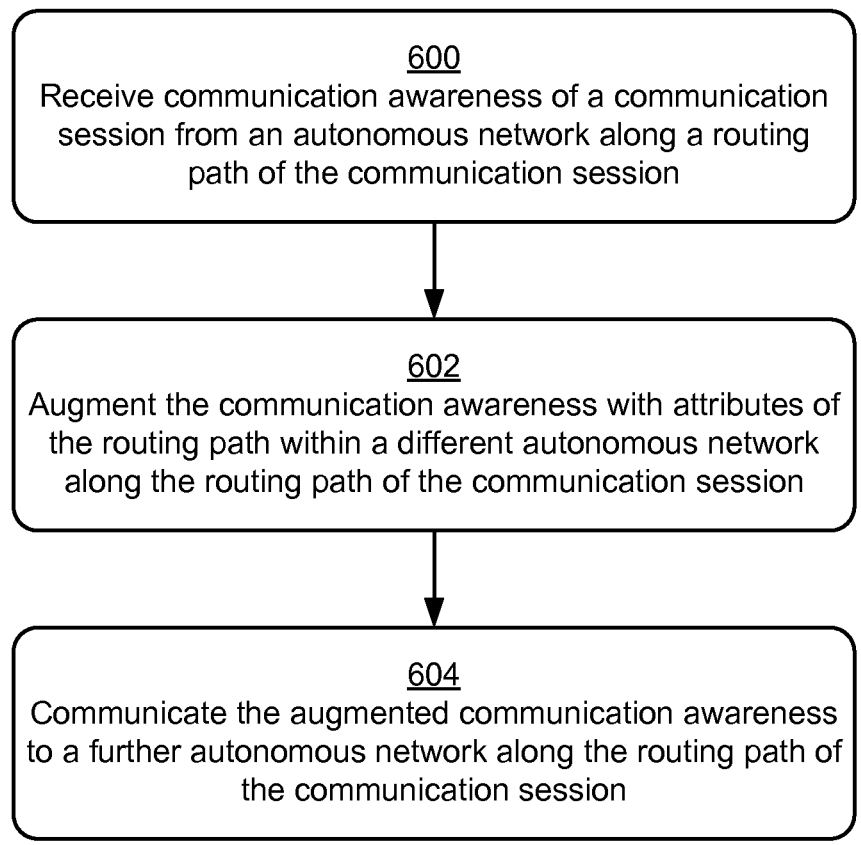
FIG. 6 is a flow diagram that describes steps in a method for augmenting communication awareness in accordance with one or more embodiments.

FIG. 6 is a flow diagram that describes steps in a method in accordance with one or more embodiments. The method describes an example procedure for augmenting communication awareness in accordance with one or more embodiments.

Step 600 receives communication awareness of a communication session from an autonomous network along a routing path of the communication session. According to various implementations, the communication awareness includes attributes of the routing path within the autonomous network and is received out-of-band from a data stream of the communication session. The communication awareness may be received by various entities, such as a network adviser for a respective network, the network adviser system 136, and so forth.

Step 602 augments the communication awareness with attributes of the routing path within a different autonomous network along the routing path of the communication session. A network adviser for the different autonomous network, for instance, receives the communication awareness from another autonomous network and augments the communication awareness with routing path attributes of its respective autonomous network. Alternatively or additionally, the network adviser system 136 augments the communication awareness with routing path attributes of the different autonomous network.

Step 604 communicates the augmented communication awareness to a further autonomous network along the routing path of the communication session. According to various implementations, the augmented communication awareness is communicated out-of-band from the communication session, e.g., from a data stream of the communication session.

The different autonomous network, for instance, communicates the augmented communication awareness to a next network (e.g., a next network adviser) along the routing path of the communication session.

Alternatively or additionally, the network adviser system 136 communicates the augmented communication awareness to a next network (e.g., a next network adviser) along the routing path of the communication session. In at least some implementations, responsive to the communication awareness being augmented, the network adviser system 136 may communicate the augmented communication awareness to multiple different autonomous networks and/or network advisers along the routing path of the communication session.

Figure 7:
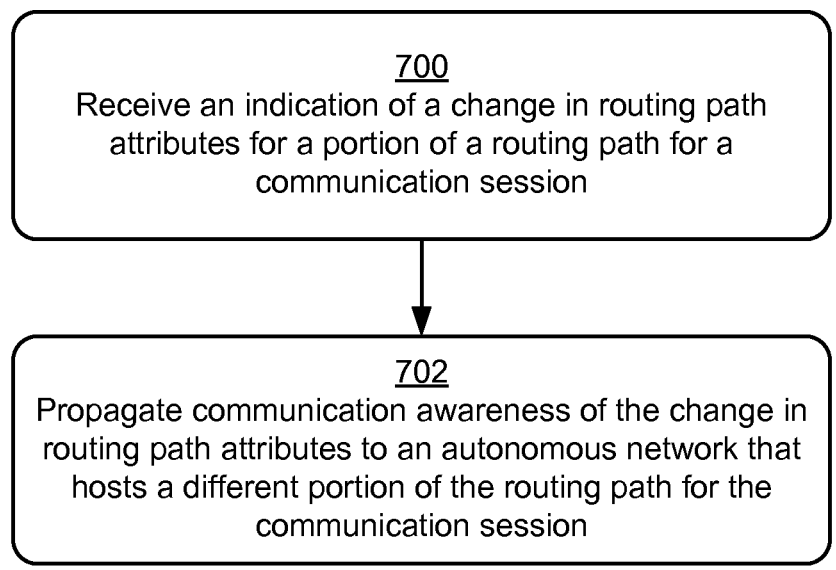
FIG. 7 is a flow diagram that describes steps in a method for propagating awareness of a change in routing path attributes in accordance with one or more embodiments.

FIG. 7 is a flow diagram that describes steps in a method in accordance with one or more embodiments. The method describes an example procedure for propagating awareness of a change in routing path attributes in accordance with one or more embodiments.

Step 700 receives an indication of a change in routing path attributes for a portion of a routing path for a communication session. According to various implementations, the indication of the change is received while the communication session is in progress. The portion of the routing path, for instance, occurs within an autonomous network of a group of autonomous networks that make up the total routing path. For example, the portion of the routing path corresponds to a set of network components along a portion of the routing path within a particular autonomous network.

Examples of different routing path attributes that may change are discussed above with reference to the example notification events and the example communication API. The change in routing path attributes, for instance, may be based on an indication of a decrease in session quality and/or an increase in session errors that occurs in the communication session across the portion of the routing path. Examples of such indicia include an increase in jitter, packet loss rate, packet error rate, and so forth. In at least some implementations, the change in routing path attributes may be indicated based on user input specifying that the quality of the communication session has decreased.

The change in routing path attributes may be based on changes in network conditions within an autonomous network that hosts the portion of the routing path, such as an increase in network congestion, a failure of one or more network components, a decrease in available bandwidth, and so forth.

According to various implementations, the indication of the change may be received by an entity associated with an autonomous network that hosts the portion of the routing path, such as a network adviser for the autonomous network. Additionally or alternatively, the indication of the change may be received by another entity, such as a network adviser for an autonomous network that hosts a different portion of the routing path, the network adviser system 136, and so forth.

Step 702 propagates communication awareness of the change in routing path attributes to an autonomous network that hosts a different portion of the routing path for the communication session. According to various implementations, the communication awareness of the change is propagated while the communication session is in progress. For instance, a network adviser for a network that hosts the portion of the routing path generates a notification of the change in the portion of the routing path. The network adviser then communicates the notification to a network adviser for a different autonomous network that hosts a different portion of the routing path, such as an adjacent network along the routing path.

Alternatively or additionally, the network advisor can communicate the notification to the network adviser system 136, which can propagate communication awareness of the change in routing path attributes to one or more network advisers for other autonomous networks along the routing path.

In at least some implementations, communication awareness of a change in routing path attributes can enable the routing path to be reconfigured. For instance, if the change indicates errors and/or problems in the communication session across the portion of the routing path, the routing path can be recalculated around that portion of the routing path. For instance, a network adviser that detects the change in routing path attributes can notify a respective network controller, which can recalculate the routing path around the portion of the routing path. The routing path, for example, can be recalculated to include a different autonomous network such that the problematic portion of the routing path is avoided.

According to various implementations, the methods described above may be performed multiple times at various stages of a communication session, such as prior to session initiation, concurrent with session initiation, during a communication session, at session termination, and post communication session. For instance, communication awareness of a communication session can be propagated and updated in real-time while the communication session is in progress to maintain dynamic and active state awareness of conditions that may affect the communication session.

Communication awareness of a communication session may also be proactively communicated prior to initiation of the communication session, such as to enlighten autonomous networks of the upcoming communication session and enable the autonomous networks to make adjustments and/or preparations to accommodate the communication session. Communication awareness of a communication session may be communicated after termination of the communication session, such as for system diagnostics and statistical analysis of network performance that occurred during the communication session.

Thus, techniques discussed herein provide a wide variety of scenarios and implementations for propagating communication awareness to different entities involved in routing communication sessions. Communication awareness enables such entities to make informed decisions regarding routing and handling of communication session data.

Having discussed some example procedures, consider now a discussion of an example system and device in accordance with one or more embodiments.

Example System and Device

Figure 8:
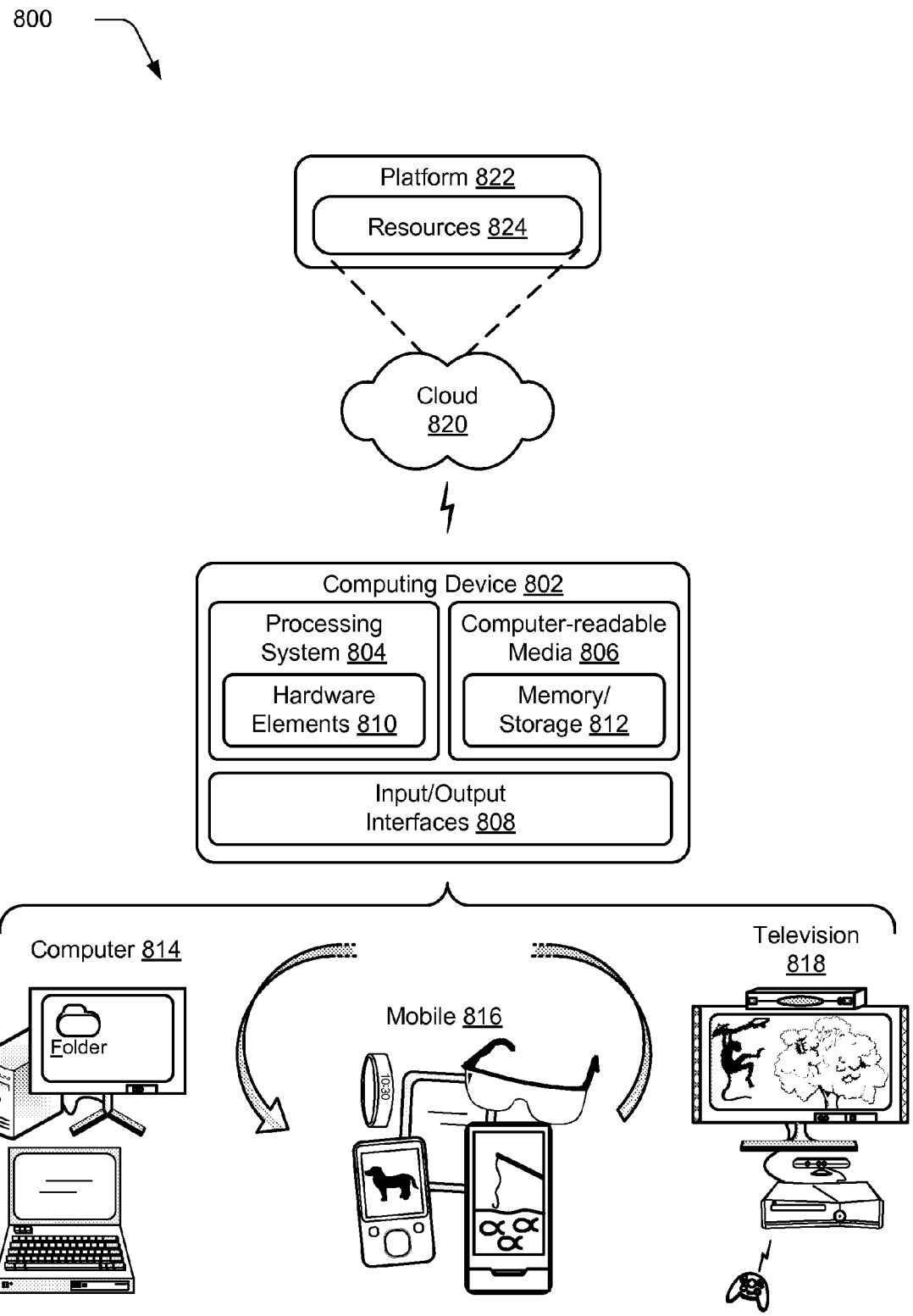
FIG. 8 illustrates an example system and computing device as described with reference to FIG. 1, which are configured to implement embodiments of techniques described herein.

FIG. 8 illustrates an example system generally at 800 that includes an example computing device 802 that is representative of one or more computing systems and/or devices that may implement various techniques described herein. For example, the client device 102 and/or the endpoint 116 discussed above with reference to FIG. 1 can be embodied as the computing device 802. The computing device 802 may be, for example, a server of a service provider, a device associated with the client (e.g., a client device), an on-chip system, and/or any other suitable computing device or computing system.

The example computing device 802 as illustrated includes a processing system 804, one or more computer-readable media 806, and one or more Input/Output (I/O) Interfaces 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 806 is illustrated as including memory/storage 812. The memory/storage 812 represents memory/storage capacity associated with one or more computer-readable media. The memory/storage 812 may include volatile media (such as random access memory (RAM)) and/or nonvolatile media (such as read only memory (ROM), Flash memory, optical disks, magnetic disks, and so forth). The memory/storage 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "entity," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 810 and computer-readable media 806 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of modules that are executable by the computing device 802 as software may be achieved at least partially in hardware, e.g., through use of computer-readable storage media and/or hardware elements 810 of the processing system. The instructions and/or functions may be executable/operable by one or more articles of manufacture (for example, one or more computing devices 802 and/or processing systems 804) to implement techniques, modules, and examples described herein.

As further illustrated in FIG. 8, the example system 800 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 800, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 802 may assume a variety of different configurations, such as for computer 814, mobile 816, and television 818 uses. Each of these configurations includes devices that may have generally different constructs and capabilities, and thus the computing device 802 may be configured according to one or more of the different device classes. For instance, the computing device 802 may be implemented as the computer 814 class of a device that includes a personal computer, desktop computer, a multi-screen computer, laptop computer, netbook, and so on.

The computing device 802 may also be implemented as the mobile 816 class of device that includes mobile devices, such as a mobile phone, portable music player, portable gaming device, a tablet computer, a wearable device, a multi-screen computer, and so on. The computing device 802 may also be implemented as the television 818 class of device that includes devices having or connected to generally larger screens in casual viewing environments. These devices include televisions, set-top boxes, gaming consoles, and so on.

The techniques described herein may be supported by these various configurations of the computing device 802 and are not limited to the specific examples of the techniques described herein. For example, functionalities discussed with reference to the network advisers, the communication service 134, and/or the network adviser system 136 may be implemented all or in part through use of a distributed system, such as over a "cloud" 820 via a platform 822 as described below.

The cloud 820 includes and/or is representative of a platform 822 for resources 824. The platform 822 abstracts underlying functionality of hardware (e.g., servers) and software resources of the cloud 820. The resources 824 may include applications and/or data that can be utilized while computer processing is executed on servers that are remote from the computing device 802. Resources 824 can also include services provided over the Internet and/or through a subscriber network, such as a cellular or Wi-Fi network.

The platform 822 may abstract resources and functions to connect the computing device 802 with other computing devices. The platform 822 may also serve to abstract scaling of resources to provide a corresponding level of scale to encountered demand for the resources 824 that are implemented via the platform 822. Accordingly, in an interconnected device embodiment, implementation of functionality described herein may be distributed throughout the system 800. For example, the functionality may be implemented in part on the computing device 802 as well as via the platform 822 that abstracts the functionality of the cloud 820.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

CONCLUSION

Techniques for propagating communication awareness for communication sessions are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A computer-implemented method, comprising:
   ascertaining that a communication session is initiated or scheduled to be initiated;
   aggregating communication awareness for multiple autonomous networks along a routing path of the communication session; and
   communicating the communication awareness of the communication session to one or more of the multiple autonomous networks out-of-band from a data stream of the communication session such that the communicating the communication awareness of the communication session is independent from routing of the communication session.

2. A method as described in claim 1, wherein said ascertaining occurs while the communication session is in progress.

3. A method as described in claim 1, wherein said ascertaining comprises ascertaining that the communication session is scheduled to occur at a future time.

4. A method as described in claim 1, further comprising, prior to said aggregating, receiving the communication awareness from at least one of the autonomous networks.

5. A method as described in claim 1, further comprising, prior to said aggregating:
receiving routing path attributes from individual networks of the autonomous networks; and
aggregating the communication awareness to include the routing path attributes.

6. A method as described in claim 1, wherein the communication awareness comprises routing path attributes of one or more of the autonomous networks.

7. A method as described in claim 1, wherein the communication awareness comprises performance attributes of the routing path within one or more of the autonomous networks.

8. A method as described in claim 7, wherein the performance attributes include one or more of jitter, packet delay, or packet drop along the routing path within the one or more of the autonomous networks.

9. A method as described in claim 1, further comprising:
receiving an indication of a change in routing path attributes for a portion of a routing path for the communication session; and
propagating further communication awareness indicating the change in routing path attributes to one or more of the autonomous networks.

10. A system comprising:
at least one processor; and
one or more computer-readable storage media including instructions stored thereon that, responsive to execution by the at least one processor, cause the system perform operations including:
receiving an indication of a communication session that is scheduled to be initiated;
ascertaining routing path attributes for the communication session within an autonomous network through which the communication session is routed; and
communicating, separately from a data stream of the communication session, communication awareness of the communication session including the routing path attributes to a different autonomous network to be involved in routing the communication session that is scheduled to be initiated.

11. A system as recited in claim 10, wherein the system comprises a network system that is implemented separately from the autonomous network and the different autonomous network.

12. A system as recited in claim 10, wherein the indication of the communication session comprises an indication that the communication session is scheduled to occur.

13. A system as recited in claim 10, wherein said communicating is performed by the autonomous network to the different autonomous network.

14. A system as recited in claim 10, wherein the communication awareness includes routing path attributes for multiple autonomous networks through which the communication session is routed.

15. A system as recited in claim 10, wherein the operations further include performing said ascertaining and said communicating multiple times while the communication session is in progress.

16. A computer-implemented method, comprising:
receiving communication awareness of a communication session from an autonomous network along a routing path of the communication session, the communication awareness including attributes of the routing path within the autonomous network and being received out-of-band from a data stream of the communication session such that the communication awareness is received separate from the data stream of the communication session; and
augmenting the communication awareness with attributes of the routing path within a different autonomous network along the routing path of the communication session.

17. A method as described in claim 16, wherein said receiving and said augmenting are performed by the different autonomous network.

18. A method as described in claim 16, wherein said receiving and said augmenting are performed by a system that is implemented separately from the autonomous network and the different autonomous network.

19. A method as described in claim 16, wherein the attributes of the routing path within the different autonomous network are received at least in part from a network controller of the different autonomous network.

20. A method as described in claim 16, further comprising communicating the augmented communication awareness to a further autonomous network along the routing path of the communication session.

* * * * *